July 27, 1965
C. A. FRANK
3,196,724
SHEAR TYPE CUTTER
Filed Oct. 1, 1962
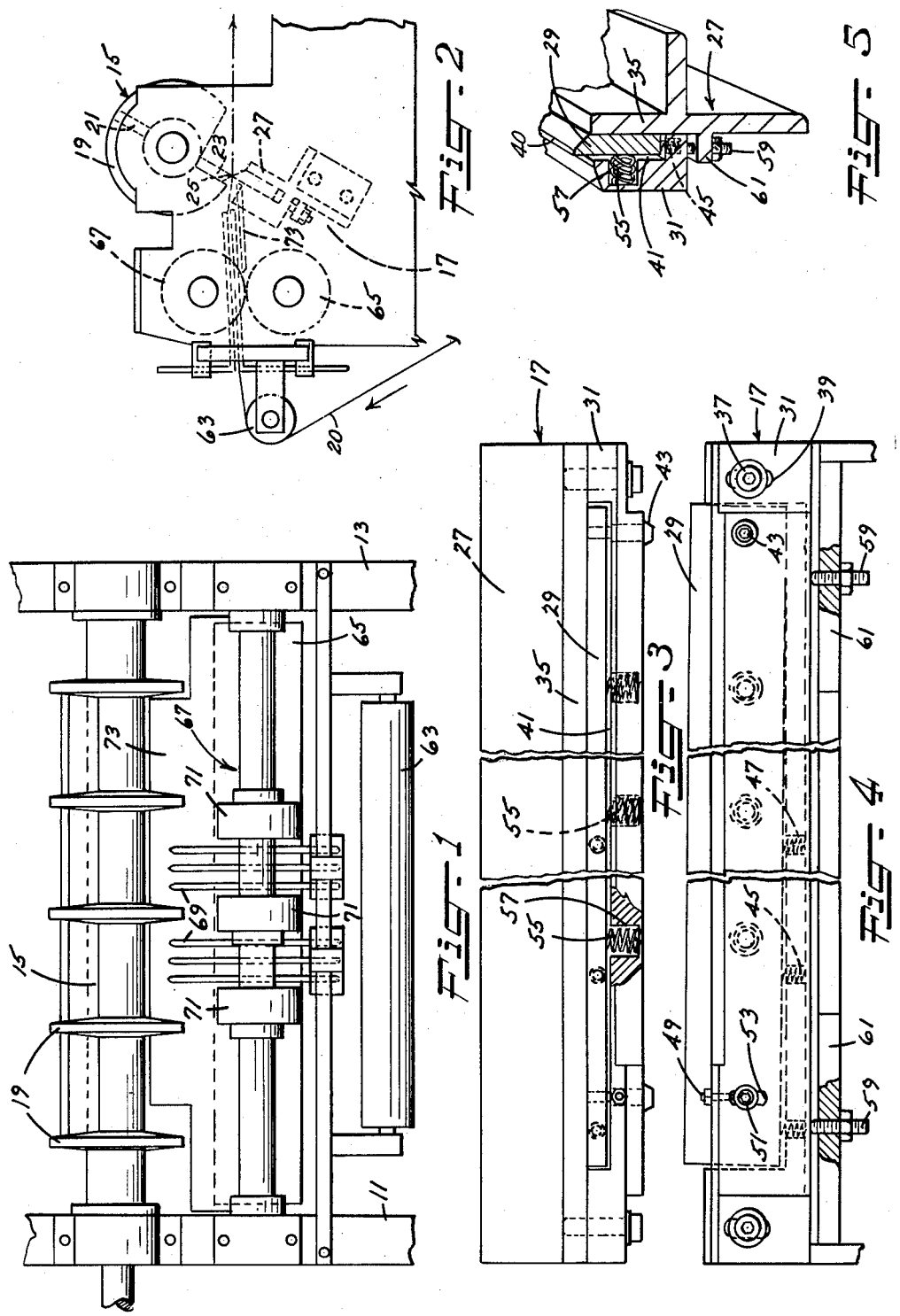

United States Patent Office 3,196,724
Patented July 27, 1965

3,196,724
SHEAR TYPE CUTTER
Carl A. Frank, Rivervale, N.J., assignor, by mesne assignments, to Avisun Corporation, Philadelphia, Pa., a corporation of Delaware
Filed Oct. 1, 1962, Ser. No. 227,233
3 Claims. (Cl. 83—349)

The present invention relates to a cutting apparatus, and more particularly to an improved apparatus for shearing a continuous sheet material into selected lengths.

One of the conventional apparatus employed in cutting continuous sheet materials includes a rotor having a projecting blade and a stationary bed-knife which are intended to together shear a sheet material simultaneously across its entire width. To assure that the cutting edges of the rotor blade and bed-knife mate exactly with each other across their entire lengths requires extremely careful and costly fabrication. Furthermore, such known apparatus must be extremely heavy and rigid to maintain a close tolerance between the cutting elements.

When employing well machined and properly adjusted cutting elements, such conventional equipment has proven satisfactory in severing films formed of regenerated cellulose, polyethylene, polypropylene, etc. With slight wear of the cutting elements, however, proper cutting of polypropylene film could not be achieved, even though such apparatus continued to effectively sever other sheet materials, such as regenerated cellulose and polyethylene films. Accordingly, a primary object of this invention is to provide a generally new or improved and more satisfactory apparatus for cutting continuous sheet materials.

Another object is the provision of an improved rotary cutting apparatus for severing continuous traveling sheet material into selected lengths with a shearing action.

Still another object is the provision of a cutting apparatus having a rotary blade and a cooperating bed-knife, in which the rotary blade lies in a plane which is inclined relative to its axis of rotation and the bed-knife is resiliently mounted to insure snug contact with the rotary blade to effect severance of sheet materials with a shearing action.

These and other objects and advantages of the invention will be apparent from the following description and accompanying drawing in which:

FIGURE 1 is a plan view of the cutting apparatus of the present invention;

FIGURE 2 is a right side view of the apparatus shown in FIGURE 1;

FIGURE 3 is a shortened plan view of a bed-knife assembly which forms a portion of the apparatus shown in FIGURE 1, with a portion thereof being broken away;

FIGURE 4 is a shortened front view of the bed-knife assembly shown in FIGURE 3; and FIGURE 5 is a fragmentary perspective view of a portion of the bed-knife assembly shown in FIGURE 4.

In general, the cutting apparatus of the present invention includes a rotor having an elongated blade projecting from its periphery and a bed-knife which together cooperate to sever sheet materials with a shearing action. The rotor blade differs from conventional apparatus by being disposed along a plane which is inclined or skewed slightly relative to the rotor axis. The bed-knife is supported at one end for pivotal movement about an axis extending at substantially right angles to its cutting edge and is resiliently urged toward the rotor blade. With this arrangement, full assurance is provided that the cutting edges of the rotor blade and bed-knife will engage snugly and progressively as they are moved relative to each other. Additionally, to counteract any slight curvature or warpage which may be present in the bed-knife, the bed-knife is resiliently urged against a fixed support and is thereby maintained in a planar condition throughout the cutting operation.

The apparatus of the present invention is particularly well suited for use with polypropylene and polyethylene films in that it facilitates film cutting operations to be extended for longer periods that can be achieved with conventional equipment. It will be understood, of course, that the apparatus of the present invention is also equally well adapted for use in severing other sheet materials.

With reference to the drawing, the sheet material cutting apparatus of the present invention includes a pair of laterally spaced side frames 11 and 13, which are provided with suitable bearings for rotatably supporting a rotor 15, and a bed-knife assembly 17. The rotor 15 is of conventional construction and includes a series of longitudinally spaced disc portions 19 which serve to advance the sheet material 20 which is to be severed, and a longitudinal rib 21 which is located substantially diametrically opposite a cutting blade 23 for maintaining rotor balance. The blade 23 is disposed along a plane which is inclined or skewed relative to the rotor axis and is provided with a substantially straight cutting edge 25.

The bed-knife assembly 17 includes a supporting bracket 27 which extends between and is secured to the side frames 11 and 13, a bed-knife 29 which is substantially parallel to the rotor axis and a knife block 31. The knife block 31 is secured to a flange 35 of the supporting bracket 27 by screws 37 which extend through slots 39 in the knife block to permit adjustment of the same, as hereafter described. The bed-knife 29 is provided with a cutting edge 40 and is disposed within a recessed portion 41 of the knife block 31 where it is pivotally connected at one end to the knife block 31 by a pin 43.

A series of compression springs 45 are positioned within and project from recesses 47 formed in the knife block 31 and tend to urge the free end of the bed-knife 29 toward the rotor blade 23 so that severance of the sheet material is effected with a shearing action, as more fully described hereafter. The upward movement of the free end of the bed-knife is limited, however, by an adjustable stop screw 49 which is threaded into the knife block 31 in position to engage with a pin 51 fixed to the bed-knife 29. As shown in FIGURE 4, the knife block 31 is provided with a slot 53 within which the pin 51 is adapted to move freely as the knife 29 is pivoted.

A series of springs 55 are also partially seated within recesses 57 formed in the knife block 31 and serve to urge the bed-knife 29 snugly against the supporting bracket flange 35 to maintain the same substantially parallel to the rotor axis and thus minimize the effect of any small curvature or warpage which may be present in the bed-knife.

To facilitate proper positioning of the bed-knife cutting edge 40 relative to the cutting edge 25 of the rotor blade 23, the knife block 31 is adapted to be adjusted by screws 59 which are extended through flanges 61 projecting from the supporting bracket 27. At the start of operations, the screws 37 are released and the free end of the bed-knife 29 is depressed by the stop screw 49 so that its cutting edge 40 is substantially parallel to the axis of the rotor. The screws 59 are then adjusted to position the bed-knife cutting edge 40 substantially on the surface of revolution of the rotor blade 23 after which the screws 37 are made snug to lock the knife block in position. The stop screw 49 is then released, permitting the free end of the bed-knife 29 to move upwardly a desired amount under the influence of the springs 45, as illustrated in FIGURE 4.

The continuous sheet material 20 which is to be cut is delivered to the cooperating rotor blade and bed-knife described above by conventional means which includes an idler guide roll 63 which serves to change the direction of the sheet material as it is drawn from a suitable source, not shown, a pair of nip rolls 65 and 67, and groups of guide rods or fingers 69 which are adjustably supported and projected between spaced annular positions 71 of the roll 67. As shown in FIGURE 5, the uppermost exposed edge of the knife block 31 is beveled to insure that the sheet material travels along an unobstructed even plane as it moves in-between the cutting elements 23 and 29. Additionally, and preferably, the apparatus of the present invention includes a rocker plate 73 which may be oscillated in sequence with the cutting operation, as for example by means of an eccentric, not shown, for releasing the severed edge of the continuous sheet material 20 from the cutting elements.

In use, the bed-knife 29 is initially adjusted in a manner as heretofore described to properly position the cutting edge thereof in proper position relative to the surface of revolution of the rotor blade 23, after which the continuous sheet material 20 is laced through the apparatus as shown in FIGURE 2 of the drawing. As heretofore mentioned, the springs 55 urge the bed-knife snugly up against the supporting bracket flange 35 and maintain the same substantially parallel to the rotor axis. The rotor 15 is then set in motion whereupon the sheet material 20 is advanced relative to the bed-knife assembly 17.

Insofar as the rotor blade 23 lies in a plane which is slightly inclined or skewed relative to the plane of the bed-knife 29, the sheet material 20 is cut progressively across its width with a shearing action as the rotor blade moves past the cutting edge of the bed-knife. Further, in view of the resilient support provided by the springs 45, the bed-knife 29 is adapted to adjust itself progressively with the cutting operation to thereby compensate for variations or manufacturing tolerances along the bed-knife cutting edge and assure that the sheet material severance is continuous across its entire width. As the rotor blade 23 starts to move beyond the bed-knife assembly 27, the rocker plate 73 releases the severed end of the sheet material from the cutting elements and permits the same to be advanced freely.

It will, of course, be apparent that, in lieu of the arrangement described above, the bed-knife may be disposed in a plane which is inclined slightly relative to the rotor axis, with the rotor blade projecting radially of the rotor itself.

It is to be understood that changes and variations may be made without departing from the spirit and scope of the invention as defined in the appended claims.

I claim:

1. Apparatus for cutting a sheet material with a shearing action including a rotor, a blade carried by and projecting from the periphery of said rotor, said blade being disposed along a plane which is inclined relative to the axis of said rotor and having a cutting edge lying on a surface of revolution about the rotor axis, a fixed structure having a surface substantially parallel to the axis of said rotor, a bed-knife, said bed-knife having a cutting edge, means supporting said bed-knife for movement toward and away from said rotor and along said surface of the fixed structure, said bed-knife cutting edge cooperating with the cutting edge on said blade for shearing a sheet material progressively across its width as said rotor is turned, and springs located at spaced intervals along the length of the bed-knife for urging the same in a direction transversely to its longitudinal axis and snugly against said surface of said fixed structure whereby said bed-knife is maintained substantially parallel to the rotor axis yet is permitted to move along said supporting structure during the shearing of a sheet material.

2. Apparatus for cutting a continuous sheet material with a shearing action including a rotor, a blade carried by and projecting from said rotor, said blade being disposed along a plane which is inclined relative to the axis of said rotor and having cutting edges lying on a surface of revolution about the rotor axis, a fixed supporting structure having a surface which is substantially parallel to the axis of said rotor, a knife block carried by said supporting structure, said knife block and said surface of the supporting structure together defining an elongated slot, a bed-knife disposed within said slot and having a cutting edge which cooperates with the cutting edge of said blade for shearing a sheet material progressively across its width as said rotor is turned, a pin extending at substantially right angles to the plane of said bed-knife and pivotally connecting one end thereof to said knife block and said supporting structure, and springs interposed at longitudinally spaced intervals between said knife block and said bed-knife for urging the bed-knife in a direction generally parallel to the axis of said pin and snugly against said surface of the supporting structure whereby said knife is maintained parallel to the rotor axis yet is permitted to move relative to said supporting structure and said knife block during shearing of a sheet material.

3. Apparatus as defined in claim 2 further including springs interposed between said knife block and said bed-knife for resiliently urging the free end of said bed-knife about said pivot pin and toward said rotor.

References Cited by the Examiner

UNITED STATES PATENTS

| | | | |
|---|---|---|---|
| 1,005,879 | 10/11 | Ries | 83—583 |
| 1,139,572 | 5/15 | Perry | 83—853 |
| 1,398,474 | 11/21 | Strawn | 83—348 |
| 2,120,329 | 6/38 | Henneke et al. | 83—583 |
| 2,130,473 | 9/38 | Ruau | 83—583 |
| 2,341,503 | 2/44 | La Bombard | 83—698 |
| 2,399,529 | 4/46 | Willits | 83—349 |
| 2,551,335 | 5/51 | Piazze | 83—348 |

ANDREW R. JUHASZ, *Primary Examiner.*

HUNTER C. BOURNE, JR., LEON PEAR, *Examiners.*